United States Patent [19]

Imler

[11] 4,018,590
[45] Apr. 19, 1977

[54] FLUID SPRAYING APPARATUS FOR TEMPERING GLASS SHEETS

[75] Inventor: Vaughn R. Imler, Valencia, Pa.

[73] Assignee: PPG Industries, Inc., Pittsburgh, Pa.

[22] Filed: Mar. 26, 1976

[21] Appl. No.: 670,595

[52] U.S. Cl. ............................ 65/348; 65/351
[51] Int. Cl.² ............................ C03B 27/00
[58] Field of Search ............ 65/104, 114, 348, 349, 65/350, 351

[56] References Cited

UNITED STATES PATENTS 3,522,029   7/1970   Carson et al. ............... 65/104

Primary Examiner—Arthur D. Kellogg
Attorney, Agent, or Firm—Dennis G. Millman; Edward I. Mates

[57] ABSTRACT

Apparatus for tempering glass sheets comprising spaced opposed plenum chambers with specially constructed elongated nozzles mounted to specially constructed apertured walls of said opposed plenum chambers by means of resilient clip means.

4 Claims, 3 Drawing Figures

FLUID SPRAYING APPARATUS FOR TEMPERING GLASS SHEETS

BACKGROUND OF THE INVENTION

1. Field of the Invention

This invention relates to apparatus for tempering flat or curved glass sheets and, more specifically, apparatus that imparts a more uniform temper to glass sheets of various configurations. The sheet is heated above its annealing range and its surfaces are chilled rapidly to below the strain point while the interior is still hot. Rapid chilling continues until the entire glass sheet cools to below its strain point. This rapid cooling causes the glass sheet to develop a thin skin of compression stress surrounding an interior stressed in tension. Such a stress distribution makes the glass sheet much stronger than untempered glass so that tempered glass is likely to shatter than untempered glass when struck by an object. Furthermore, in the less frequent times when an outside force is sufficiently large to cause tempered glass to fracture, tempered glass breaks up into a large number of smoothly surfaced, relatively small particles which are far less dangerous than the larger pieces with jagged edges that result from the fracture of untempered glass.

Typical prior art tempering apparatus include nozzles extending from plenum chambers to direct a plurality of air blasts against the opposite major surfaces of a glass sheet. The prior art provides means to impart movement to the nozzles in unison relative to the glass surface to avoid directing the air blasts against fixed locations on the glass to cool the latter rapidly while other locations adjacent the fixed locations are not cooled as rapidly. Without such relative movement, patterns of iridescence form on the surface of the tempered glass. These patterns of iridescence are very annoying when viewed in reflection.

The glass tempering art has developed many techniques for imparting relative motion between the array of nozzles and the glass to avoid iridescent patterns. Some of these involve linear reciprocation of the nozzles. Others involve linear movement of glass sheets past an array of fixed nozzles. Others involve applying orbital movement (elliptical or circular) of nozzles relative to a glass sheet supported at a fixed position.

The shape of the glass sheet to be tempered and its manner of support between plenum chambers determines the best technique for providing relative movement between the nozzle arrays extending from the plenum chambers and the glass sheet to be tempered. For example, when vertically supported glass sheets are oriented with a sharp blend extending in a given direction, it is best to reciprocate the nozzle arrays in spaced vertical planes along axes parallel or approximately parallel to the given direction. When a flat glass sheet or a gently curved sheet of shallow curvature is tempered, it is usually most convenient to impart air from nozzles to which are imparted circular orbital movements that overlap corresponding movement of adjacent nozzles in spaced planes parallel to the position occupied by the glass sheet.

2. Description of the Prior Art

U.S. Pat. No. 3,849,100 to Antonio Luppino and U.S. Pat. No. 3,873,294 to Dennis M. Goolsbay disclose glass sheet tempering apparatus comprising opposing arrays of nozzles extending from spaced, opposing plenum chambers into a space therebetween containing a position that is occupied by a heated glass sheet when fluid under pressure is applied to said plenum chambers for discharge against the opposite surfaces of a glass sheet when the latter occupies said position. Means is provided with each of these apparatus to move the opposed plenum chambers in unison in either a linear reciprocating motion more suitable for sharply curved glass sheets or a closed orbital motion more suitable for flat or gently curved glass sheets. In each of these patents, each tempering nozzle of each tempering nozzle array is rigidly attached to an apertured wall of each plenum chamber and a flexible extension is applied to the inner end of each nozzle. Extensions of identical lengths are applied to provide a space to receive flat glass and extensions of different lengths are applied in a pattern to provide a curved space to receive curved glass.

Apparatus having nozzles attached to apertured plates of plenum chambers of the types disclosed in the patents to Luppino and Goolsbay were characterized by cylindrically shaped nozzles having their inner end portions externally threaded to receive inner and outer clamping nuts and washers that secured the nozzles to the apertured walls. The presence of the clamping nuts near the entrance to the apertures interrupted the smooth flow of fluid into the nozzles and thus caused a need to supply the fluid to the plenum chambers at a relatively high fluid pressure in order to deliver the fluid through the nozzles to the glass major surfaces at a rate sufficient to cool the glass major surfaces sufficiently rapidly to impart a desired degree of temper.

The energy crisis enhanced a need to develop glass tempering apparatus that delivered cold fluid to the glass surfaces at a sufficient rate of flow using as little energy as possible.

Fluid delivery systems of the prior art that improved the rate of cold fluid flow per unit of energy expended in blowing the fluid into the cold fluid supply nozzles or other delivery means required relatively thick walls for the apertures through which the cold fluid was supplied. This necessitated relatively expensive apertured walls for tempering apparatus and/or more power required to move the plenum chambers in unison in either reciprocating paths or closed orbital paths.

U.S. Pat. Nos. 2,968,126 and 3,227,540 to Richardson disclose cold fluid delivery systems comprising a series of fluid supply pipes having thick walls apertured to provide elongated passages having three different degrees of taper from their inner ends to their outer ends (U.S. Pat. No. 2,968,126) and a special shape to their inner ends including a reentrant ridge that extends toward the center of its associated supply pipe (U.S. Pat. No. 3,277,540) It is difficult and expensive to fabricate thick wall pipes to the shapes required in these patents.

U.S. Pat. No. 2,080,083 to Magnien discloses a glass tempering apparatus comprising opposed plenum chambers having outer apertured walls whose apertures for delivering cold air jets are countersunk to provide generally conically shaped inner portions merging into cylindrically shaped outer portions. No nozzles extend from the walls of the Magnien apparatus.

U.S. Pat. No. 2,118,183 to Fowler discloses nipples extending from plenum chambers through which jets of air are directed against a glass sheet. The nipple arrangement is similar to the nozzle arrangements in U.S.

Pat. No. 3,849,100 to Luppino and U.S. Pat. No. 3,873,294 to Goolsbay described previously.

U.S. Pat. No. 3,881,906 to Ritter discloses apparatus for tempering glass where the plenum chambers have relatively thick walls drilled with holes and counterbored to provide conically shaped inner ends.

Other patents reported in a novelty search report as being pertinent to the present invention include U.S. Pat. Nos. 3,353,946 to McMaster, 3,455,670 to McMaster and 3,455,670 to McMaster and British Pat. No. 441,017 to Pilkington.

SUMMARY OF THE INVENTION

The present invention provides apparatus for tempering glass sheets comprising a pair of spaced, opposed plenum chambers, each having an apertured wall with a front surface facing a glass sheet occupying position and a rear surface facing the interior of said plenum chamber and a plurality of nozzles extending through each of said apertures forward toward said glass sheet occupying position, means for supplying fluid under pressure to said plenum chamber for discharge through said nozzles toward the surface of a hot glass sheet at a rate sufficient to impart at least a partial temper to said glass sheet when the latter occupies said position characterized by each said nozzle having a first portion extending from said apertured wall toward said position and a second portion within said apertured wall, said second portion being flared, each of said apertures having a flared inner portion constructed and arranged to receive said flared second portion of its associated nozzle in abutting relation with said flared inner position of said apertured wall, the application of fluid under pressure into said plenum chamber forcing said flared second portion of said nozzles against the respective flared inner portions of said apertured wall. Additional features of a specific embodiment of the present invention include the inclusion of elongated nozzles extending several times the thickness of the apertured walls of the plenum chambers from which they extend, resilient clip means for rapidly fixing the first nozzle portions to the front surfaces of the apertured walls, the inner ends of the second portions of the nozzles terminating in such a manner that they are substantially aligned with the rear surface of the apertured wall of said plenum chamber and means to impart motion to said plenum chambers.

The details of the present invention will be better understood in the light of the description of a specific embodiment thereof that follows.

BRIEF DESCRIPTION OF THE DRAWINGS

In the drawings that form part of the description of the illustrative embodiment wherein like reference numbers refer to like structural elements.

DESCRIPTION OF A PREFERRED EMBODIMENT

Figure 1:
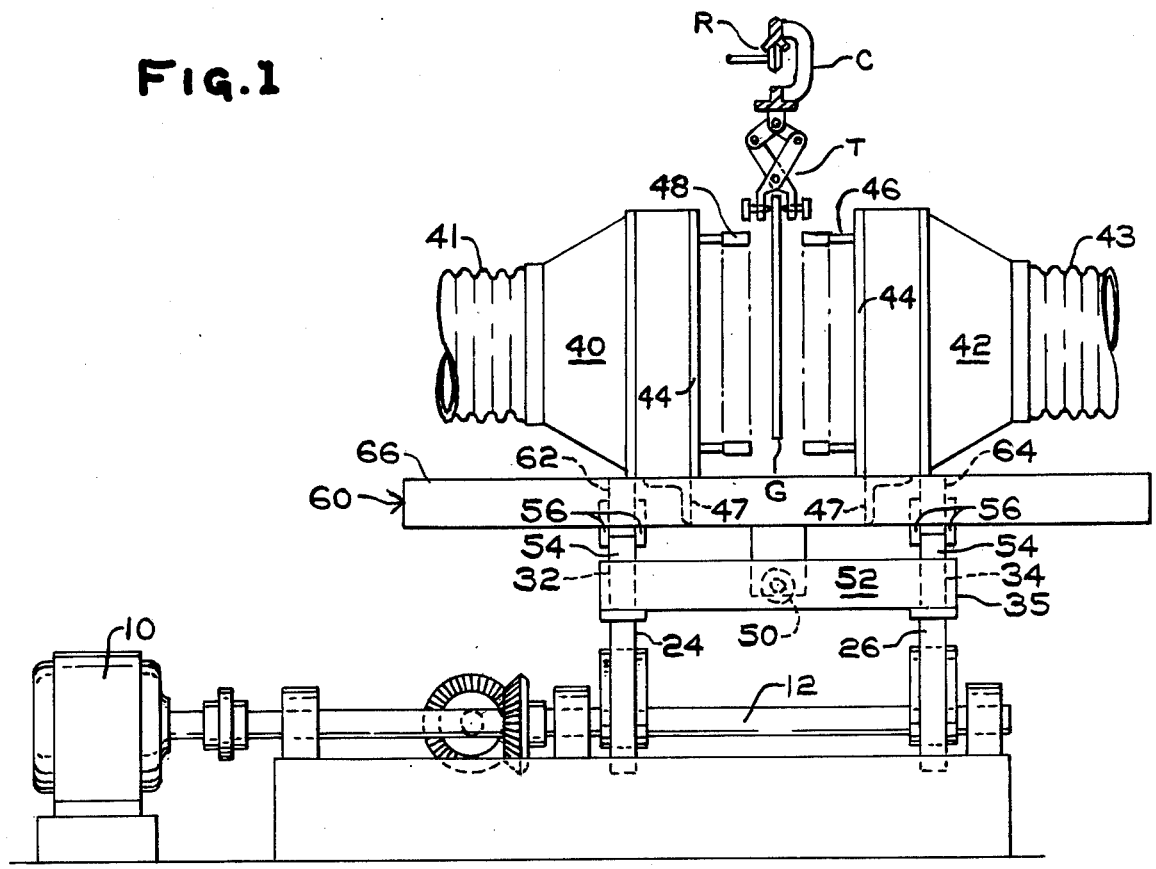
FIG. 1 is an end assembly view, partly in phantom of glass sheet tempering apparatus for which the present invention is suitable.
Figure 3:
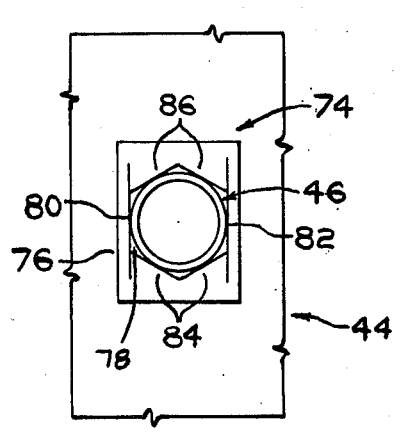
FIG. 3 is a frontal view taken along lines 3—3 of FIG. 2.

Referring to the drawings, a drive motor 10 operates through a main drive shaft, a pair of eccentrics 24 and 26, and horizontal longitudinal members 32 and 34 comprising a lower skeleton structure. The eccentrics connecting skeleton structure to the drive motor 10 cause the skeleton structure to move in a closed circular orbital path when actuated by drive motor 10.

A plenum chamber 40 is rigidly mounted to one side of skeleton structure 35 and an opposing plenum chamber 42 is rigidly mounted to the other side of skeleton structure 35. Thus, the plenum chambers 40 and 42 move in closed circular orbital patterns with the skeleton structure.

The pair of plenum chambers 40 and 42 is connected through flexible conduits 41 and 43, respctively, to a conventional blowing means (not shown). An apertured wall 44 is provided at the opposing inner ends of each plenum chamber. Each aperture 45 in the apertured wall supports an elongated nozzle 46.

Flexible nozzle extensions 48 are provided where needed to form a pair of spaced discontinuous shaped surfaces conforming to the shape of glass sheets undergoing treatment. To accomplish this, nozzle extensions 48 of different lengths are attached over the free ends of different nozzles 46 to provide spaced arrays of the ends of the flexible nozzle extensions 48 that conforms to any shape desired. The nozzles 46 are preferably of tubular metal and the nozzle extensions 48 of synthetic silicone rubber or spring metal or the like. The free inner ends of the nozzle extensions 48 terminate at equal distances from the positions occupied by the portions of a glass sheet that they face.

A glass sheet G is shown suspended by one or more pairs of tongs T of the self-closing type. A carriage C that rides on a series of rotatable rolls R of a roller conveyor is used to support the tongs T. Any conventional type of tong may be used to grip the glass sheet G near their upper edge. However, it is preferred to use tongs of the type shown in U.S. Pat. No. 2,991,114 to Lee R. Robinson which are provided with stops that engage the upper edge of the glass so that the glass gripping elements of the tongs engage the major surfaces of the glass at a definite, predetermined distance from the upper edge that is neither too close to the upper edge nor too far from the upper edge.

The plenum chambers 40 and 42 are reinforced by intermediate cross-bracing members 47, respectively, and both are reinforced by outer horizontally extending member 62 and 64 rigidly connected by end members 66 at their corresponding ends.

A horizontal piston 50 is secured to a cross member 52 and has its rod connected to an angled member. The latter is connected at its lateral ends to upper horizontally extending members 62 and 64 of an upper skeleton structure 60.

Each of the horizontal longitudinal members 32 and 34 of the lower frame structure 35 is provided with a pair of horizontally extending guides 54 that slidable support a corresponding pair of brass sliding members 56 attached to respective horizontally extending members 62 and 64 of the skeleton structure 60. Thus, whenever piston 50 is actuated to reciprocate, it causes the brass sliding members 56 to slide back and forth over the respective horizontally extending guides 54, thus imparting a reciprocating motion to skeleton structure 60 and its supported plenum chambers 40 and 42 and their attached nozzles 46. Thus, blasts of air moving through arrays of nozzles 46 toward the opposite surfaces of a glass sheet G are played over the opposite major surfaces of the glass sheet in overlapping reciprocating patterns.

When air is applied under pressure to the plenum chambers for discharge through the arrays of nozzles against the opposite surfaces of a glass sheet supported between said nozzle arrays, the relative movement imparted to the nozzles causes the air blasts to be directed through the nozzles toward the opposite glass sheet surfaces over relatively moving areas of the glass that overlap one another so as to cause the glass to be cooled more uniformly. At the same time, the spaces between adjacent nozzles provides room for removing air blasts that are warmed by the glass cooling step.

As stated previously, it is necessary to impart relative motion between the arrays of nozzles and the glass sheet in order to avoid establishing an iridescence pattern in the glass resulting from non-uniformily chilling the glass. The described apparatus provides either horizontal linear reciprocation for the upper frame-like skeleton structure 60 and its supported plenum chambers 40 and 42 through movement imparted by piston 50 with drive motor 10 not operating or provides movement for nozzles 46 in closed circular orbit patterns that overlap one another whenever piston 50 is not activated and drive motor 10 is actuated to move both the lower frame structure and the upper frame-like skeleton structure in unison. One main advantage of the present invention is the ease by which the arrays of nozzles 46 can be attached to or removed from the aperture walls 44. Another is that both the nozzles 46 and the apertured walls 44 are constructed and arranged in such a manner that the individual nozzles fit in individual apertures 45 and their seating in the respective apertures is improved when pressurized fluid is imparted to the plenum chambers 40 and 42 for delivery through the nozzles.

According to a specific embodiment of this invention, each nozzle 46 has a first portion 70 of circular cross-section extending from the apertured wall a distance several times the thickness of the apertured wall and a second portion 72 that is flared into a conical shape, the base 74 of the cone being approximately flush with the inner surface 49 of the apertured wall 44 to provide smooth flow of cold fluid from the plenum chamber to the nozzle. The apertured wall 44 has each nozzle receiving aperture 45 provided with a flared inner portion into which the flared second portion 72 of nozzle 46 seats. When pressurized fluid is applied to the plenum chambers, the pressure improves the seating of the nozzle's flared second portion 72 against the flared portion of the aperture 45.

As a further precautionary feature, a spring clip 74 is provided around the first portion 70 of each nozzle 46 and is applied to the outer surface 51 of the apertured wall 44. Each spring clip 74, when applied against the outer surface 51 holds the nozzle 46 about which it is applied within the corresponding aperture 45 even in the absence of pressure in the plenum chamber. A Tinnerman speed clip spring/friction fastener is readily available commercially for this purpose.

Figure 2:
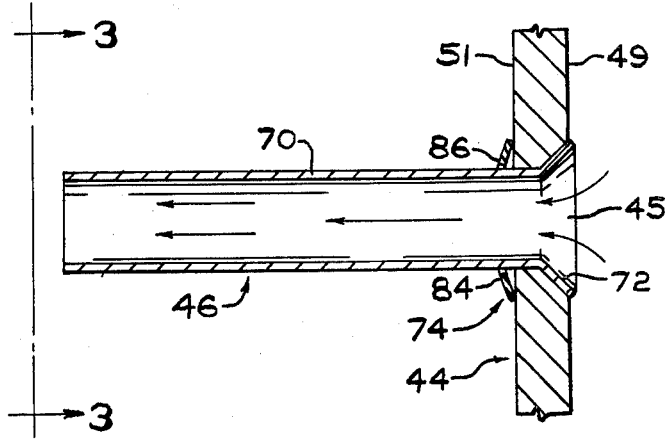
FIG. 2 is an enlarged sectional view of a single nozzle showing how it is constructed and arranged relative to an illustrated portion of an apertured wall of a plenum chamber of tempering apparatus according to the present invention.

A Tinnerman clip is a thin arcuate metal sheet 76 of rectangular configuration having a hexagonal cut-out portion 78 disposed centrally thereof with a pair of opposite sides 80 and 82 extending parallel to the sides of the sheet. The distance between opposing sides of the hexagonal cut-out portion approximates the outer diameter of the portion 70 of the nozzle 46 and the metal sheet is slit along extensions of opposite ends of the opposite sides 80 and 82 to form flexible sheet portions 84 and 86. The clip 74 is forced along the cylindrically shaped first nozzle portion 70 with its concave surface facing the outer surface 51 of the apertured wall 44 in a snug fit around the nozzle so that when it engages the outer surface 51, clip 74 is distorted to the shape depicted in FIG. 2 with flexible sheet portions 84 and 86 engaging the nozzle 46 to secure the nozzle first portion 70 in an orientation extending normal to the apertured wall.

Whenever it is desired to remove a nozzle, the clip can be lifted and removed from its position against the outer surface 51 and surrounding the first portion 70 of nozzle 46. The nozzle 46 can then be moved inward of the aperture 45 and removed from its position along apertured wall 44. A typical Tinnerman clip is approximately 1 inch (25.4 millimeters) by 25/32 inch (19.8 millimeters) wide with its opposite sides of the hexagonal cut-out portion parallel to the longer edges cut about ⅛ inch (3.2 millimeters) beyond each of said sides and has a thickness of about 0.020 inch (0.5 millimeter).

Apparatus illustrative of the present invention comprises plenum chambers having apertured walls approximately ½ inch (12.7 millimeters) thick. Nozzles of 16 gauge thickness with a first cylindrical portion having a diameter of about ⅛ inch (12.7 millimeters) thick and a second portion flared at an angle of 45° are provided in each aperture. The apertures 45 are sized to conform to the outer dimensions of the nozzles so that the outer half of each aperture near outer surface 51 is round and the countersunk portion near the inner surface 49 is flared. The length of the nozzles is 3.5 inches (88.9 millimeters) to 5.5 inches (140 millimeters) or 7 to 11 times the thickness of the walls to provide an elongated passage to collimate the flow of cold fluid tempering medium toward an adjacent major glass surface.

For linear reciprocation, the nozzles are arranged in parallel rows. The nozzles in each row are spaced 4 inches (101.6 millimeters) apart center to center along the direction or reciprocation, adjacent rows are offset with their nozzles half-way between the nozzles of the first row in the direction of reciprocation and adjacent rows are separated 1 inch (25.4 millimeters) between the centers of the nozzles in the rows. The amplitude of linear displacement is 3.5inches (88.9 millimeters) for the plenum chambers.

For circular obital movement, nozzles are arranged in a diamond pattern with each nozzle arranged at a corner of a diamond 2 inches (50.8 millimeters) on each side from nozzle center to nozzle center. The diameter of the orbit is 3.5 inches (88.9 millimeters).

The distance between the nozzle ends and the adjacent major glass sheet surfaces is usually in the range of 3 to 4 inches (77.4 to 101.6 millimeters). This distance is close enough to enable cold fluid tempering medium in the form of air blasts to cool the major glass surfaces sufficiently rapidly to impose the desired temper, yet not so close as to form dimples of sufficient magnitude to be visible to the naked eye when air blasts are imparted through the nozzles.

A typical program of operation for the above-identified apparatus is as follows: As a glass sheet G (supported by tongs R suspended from a carriage C)

reaches the temperature needed for tempering, it is transferred from a furnace (not shown) by moving the carriage C along conveyor rolls R to a position between the plenum chambers 40 and 42. The blowers are actuated to start delivering air under pressure to plenum chambers 40 and 42 for exhaust as air blasts through nozzles 46 against the opposite surfaces of the glass sheet. The main drive shaft 10 or the reciprocating piston 50 operates continuously throughout the operation to avoid any inertia problems brought about by the fact that the plenum chambers and the skeleton supporting structures have too great a mass to start and stop movement intermittently. Therefore, air is blasted in moving patterns relative to the glass sheet G supported therebetween for sufficient time to impart the desired temper in the glass.

A timer actuated by a limit switch that initiates the air blasts times out to shut off the blower that supplies pressurized air to the moving plenum chambers, and the conveyor rolls R are actuated to transfer the carriage C to a subsequent treating station which may be an unloading station. The cooling or quenching station is now in condition to receive the next glass sheet to be processed.

EXAMPLE I

To demonstrate the utility of the present invention, tempering apparatus provided with externally threaded cylindrical nozzles attached to apertured walls of opposed plenum chambers using inner and outer attachment nuts as in the prior art operating at line pressure produced an air flow of 17 standard cubic feet per minute (approximately 0.008 cubic meters per second) through the prior art nozzles. When the apertures were countersunk to provide flared inner ends and the nozzles provided with flared inner portions fitting in the flared inner ends of the apertures and with the inner ends of the nozzles aligned with the inner wall surfaces, the nozzle flow was increased to 21 standard cubic feet per minute (approximately 0.010 cubic meters per second) using the same line pressure.

EXAMPLE II

Another example of how the present invention has improved the efficiency of tempering apparatus is found in the experience of tempering float glass sheets having a nominal thickness of 5/32 inch (4 millimeters). The apparatus used in Example I before modification required a plenum pressure of 12 ounces per square inch (approximately 316 kilograms per square meter) to develop a minimum temper involving a surface compression stress of 16,000 pounds per square inch (about 6.7 million kilograms per square meter). After the modification to the present invention as described in Example I, the same minimum temper in the same thickness float glass was obtained using a plenum pressure of only 9 ounces per square inch (approximately 237 kilograms per square meter). Thus, a considerable savings in energy can be attributed to the present invention. In addition to the saving in energy consumption, less loss of production pieces due to breakage of glass sheets in the cooling station resulted from the application of the cold fluid tempering medium at lower pressure against the opposite glass sheet surfaces. This reduction in loss is believed to be the result of less buffeting of glass sheets subjected to blasts of fluid tempering medium at lower pressures and less pull of the glass against the glass gripping elements of tongs used to suspend the glass sheets during the tempering operation due to the lower pressure of the applied cold fluid tempering medium against the opposite major glass sheet surfaces.

The description of the preferred illustrative embodiment has been for the purpose of illustration rather than limitation. Tempering apparatus capable of only one degree of movement, that is linear reciprocation or orbital motion is tempering apparatus that remains fixed in position while glass sheets move relative thereto and tempering apparatus oriented to apply cold fluid tempering medium against the opposite major surfaces of glass sheets oriented in positions other than vertical may also be provided within the teaching of the present invention. The dimensions and operating conditions recited are included for description of the illustrative embodiment and are subject to change within the teaching of this invention. It is understood that various other changes well known in the glass tempering art may be made without departing from the gist of the invention as defined in the claimed subject matter that follows.

I claim:

1. Apparatus for tempering glass sheets comprising a pair of spaced, opposed plenum chambers, each having an apertured wall with a front surface facing a glass sheet occupying position and a rear surface facing the interior of said plenum chamber and a plurality of replaceable nozzles extending through each of said apertures forward toward said glass sheet occupying position, means for supplying fluid under pressure to said plenum chamber for discharge through said nozzles toward the surface of a hot glass sheet at a rate sufficient to impart at least a partial temper to said glass sheet when the latter occupies said position, each said nozzle having a first portion extending from said apertured wall toward said position and a second portion within said apertured wall, said second portion being flared, each of said apertures having a flared inner portion constructed and arranged to receive said flared second portion of its associated nozzle in abutting relation with said flared inner portion of said apertured wall, the application of fluid under pressure into said plenum chamber forcing said flared second portion of said nozzles against the respective flared inner portions of said apertured wall, and resilient clip means friction-fitted around said first portion of each nozzle and engaging said front surface of the apertured wall so as to maintain said abutting relationship between the flared second portion of the nozzle and the respective flared aperture and to secure the first portion of said nozzles in an orientation extending normal to said apertured wall.

2. Apparatus as in claim 1, wherein said first portion of said nozzles extends forward of said apertured wall at least several times the thickness of said apertured wall.

3. Apparatus as in claim 1, wherein said second portion of said nozzles has a surface substantially aligned with said rear surface of said apertured wall of said associated plenum chamber to enable said fluid under pressure in said plenum chamber to flow smoothly into said flared second portions of said nozzles.

4. Apparatus as in claim 1, further including means to impart motion to said plenum chambers to cause said nozzles to move relative to said glass sheet occupying position.

* * * * *